United States Patent Office 3,342,120
Patented Sept. 19, 1967

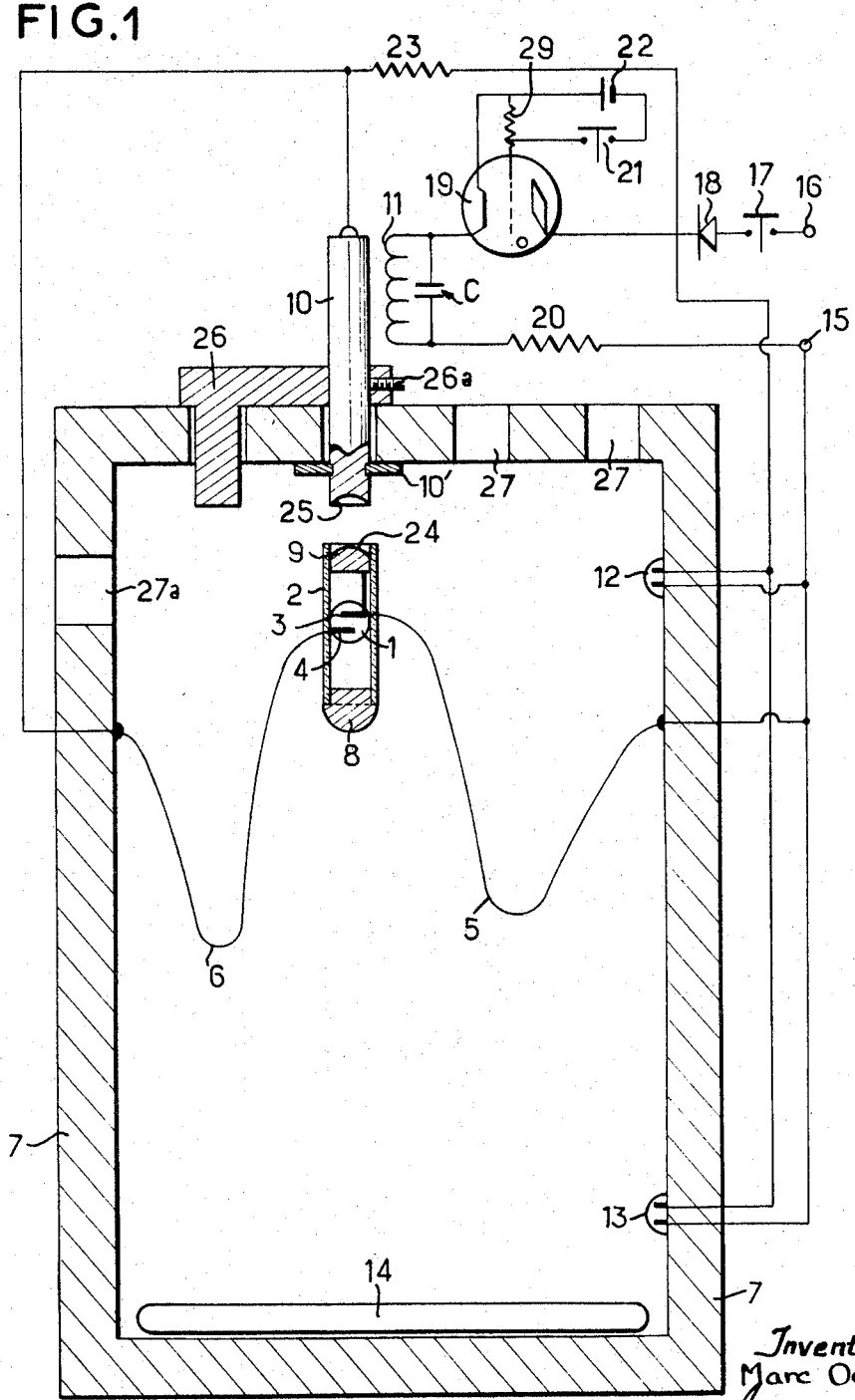

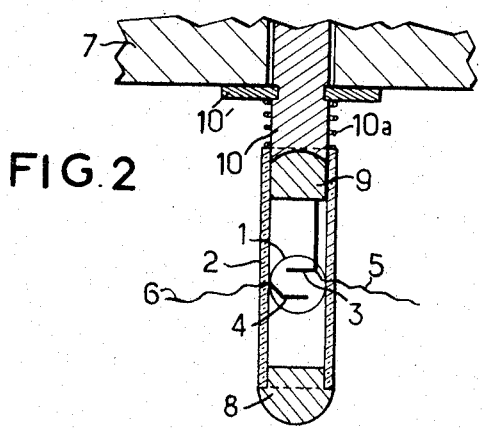
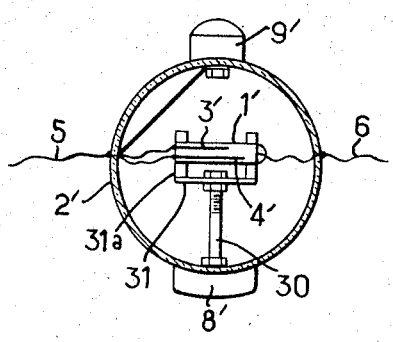
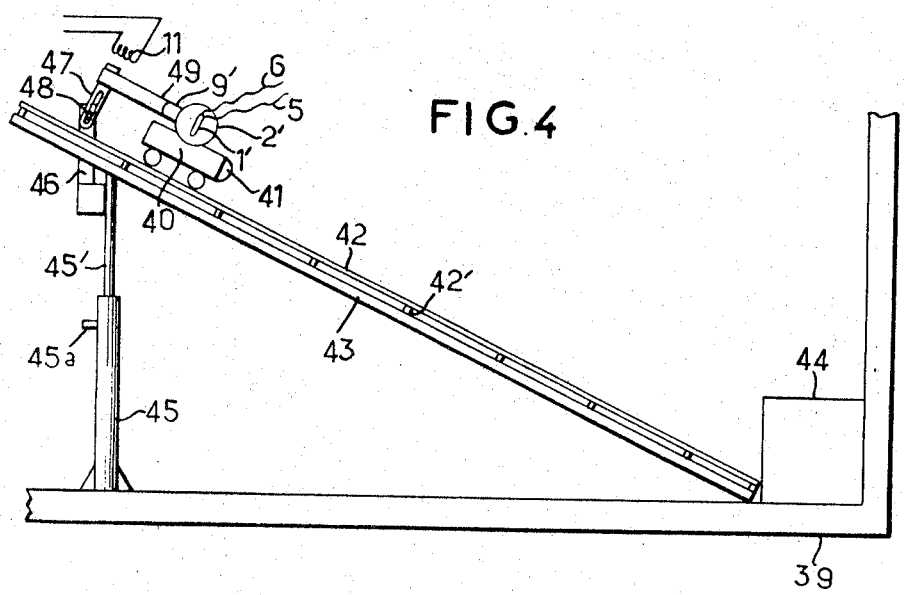
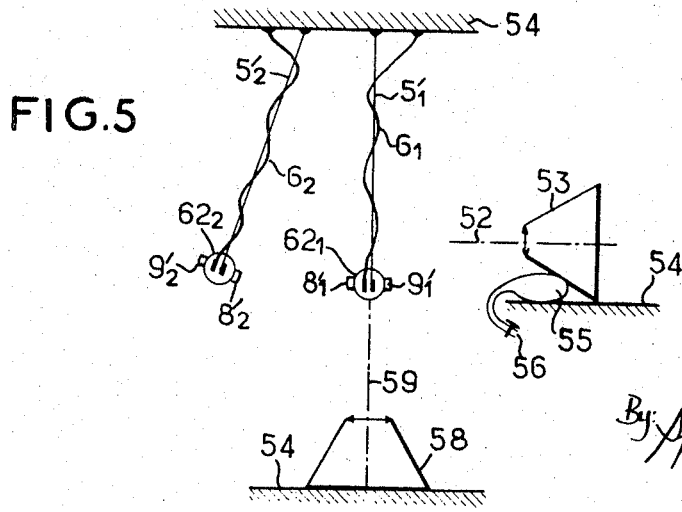

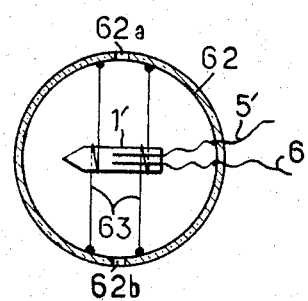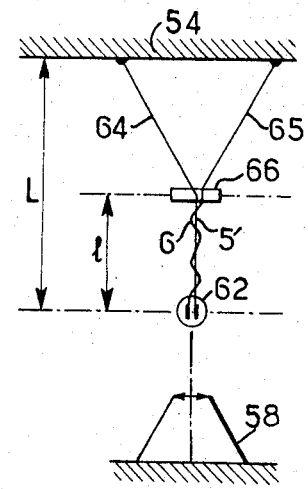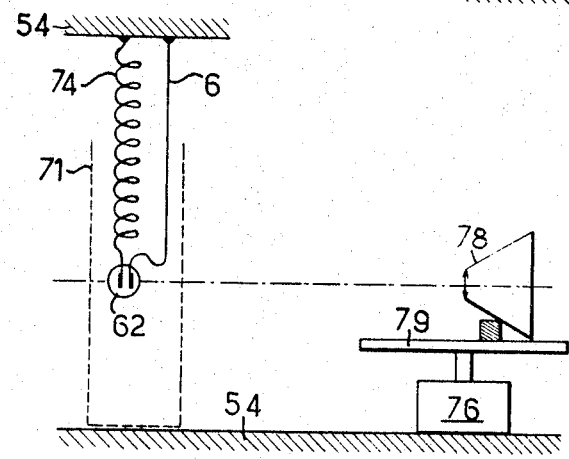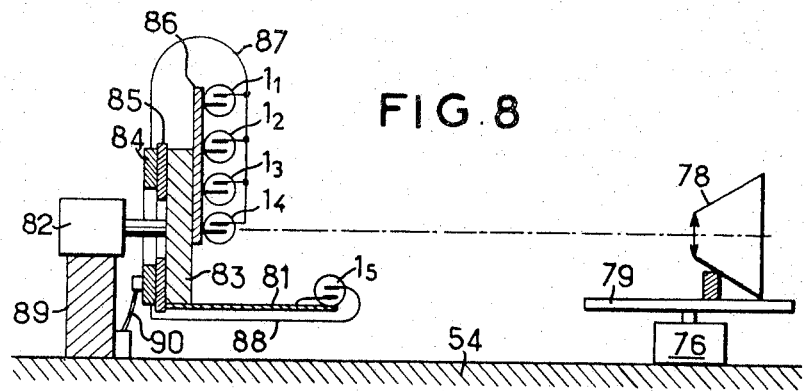

3,342,120
DEVICE FOR STUDYING THE BEHAVIOR OF MOVING BODIES
Marc Odier, Blvd. Exelmans, Paris 16, France
Filed Mar. 1, 1965, Ser. No. 436,185
Claims priority, application France, Mar. 6, 1964, 966,313; Apr. 13, 1964, 970,677, May 15, 1964, 974,622
9 Claims. (Cl. 95—11)

ABSTRACT OF THE DISCLOSURE

Apparatus for studying the basic laws of motion, which apparatus includes an object whose motion is to be studied, a small light source carried by the object and permanently connected to an electrical power source for emitting either a continuous or intermittent light, and means for releasably holding the object at the upper end of its travel path, the object traversing the field of view of an optical recording device as it moves along its travel path after having been released.

---

This invention relates to devices for studying the behavior of moving bodies and particularly to improved apparatus which facilitate the study of a wide variety of movements.

Various techniques are currently known for demonstrating and verifying, particularly in connection with the study of basic physics, the basic laws governing the motion of objects.

According to one such technique, the object whose motion is to be studied is permanently illuminated by a light source and its motion is recorded by means of a camera whose shutter is tripped at predetermined intervals. Such an arrangement suffers from the obvious drawback of being costly, and hence beyond the means of many schools, because cameras of this type, and apparatus for operaing them, are relatively expensive.

According to a second technique, the camera shutter is held open during the entire period of motion to be studied and the moving object is illuminated by a periodic light source. It is of course necessary, with such an arrangement, to take care that all of the surfaces around and behind the object be substantially non-reflecting so that the object itself will stand out on the resuling photograph.

Both of the above arrangements have the drawback of requiring a relatively large light source.

There exist other, and more primitive, apparatus for studying simple motions, devices such as the Atwood machine and the Morin machine being typical thereof. These devices are relatively simple and inexpensive, but they are also severely limited in the accuracy of their results, the type of information they can yield, and the types of motion they can be used to study.

It is a general object of this invention to overcome, or greatly diminish, the above-noted drawbacks.

A more specific object of this invention is to permit the accurate photographic recording of a large variety of relatively simple motions.

Another object herein is to permit the photographic study of such motions while dispensing with the need for expensive or complicated photographic apparatus or a large intermittent or continuous light source.

The present invention seeks to produce an improved study apparatus by mounting a small light source, which is preferably constituted by a neon lamp, directly on the object whose motion is to be recorded, by supplying a periodic exciting current to the lamp, by positioning a camera so that it will photograph the path traversed by the object, and by maintaining the camera shutter open during the period of movement of the object.

It should be obvious that such an arrangement presents several advantages particularly in that only a small light source is required and any type of camera capable of taking time-exposure photographs may be used.

These and other objects, features and advantages of the present invention will become more readily apparent from the following detailed description when taken together with the annexed drawings, in which:

FIG. 1 is a partially cross-sectional front view, and partially schematic view, of one preferred embodiment of the present invention;

FIG. 2 is a partial front view showing a detail of a modified form of the apparatus of FIG. 1;

FIG. 3 is a front view of a second embodiment of the object whose motion is to be studied;

FIG. 4 is a front view of another embodiment of the present invention; and

FIGS. 5–8 are simplified views of further embodiments of this invention.

Referring first to FIG. 1, there is shown an object whose motion is to be studied constituted by a neon lamp 1 rigidly mounted in a transparent casing 2, which is in the form of a cylinder in the present embodiment, carrying, at its lower end, a resilient member 8 and, at its upper end, a metallic member 9. These latter two elements will be described in greater detail below.

Lamp 1 comprises two electrodes 3 and 4, one or both of which will be periodically rendered luminous at a constant rate and with constant periods of illumination during the fall of the object. Each of these electrodes is connected to current supply circuitry by means of a respective one of the conductors 5 and 6, which conductors are made as supple and light as possible, in order to insure that they have substantially no influence on the motion of the falling object. The conductors are attached, through the wall of casing 2, at diametrically opposed sides of the object so that any influence they do exert will be symmetrically distributed with respect to the center of gravity of said object. Further, they are given a length sufficient to ensure that they will remain slack during the entire period of travel of the object.

The other ends of these conductors are attached to terminals mounted in the side walls of a support frame 7. Frame 7 acts as a support for the entire apparatus and has its forward end (that which lies in front of the plane of the figure) open to permit a camera placed in front of the frame to photograph the object. Its rear end may also be open, but it is preferred that it be closed and that the interior surface of the resulting rear wall be given a nonreflecting surface in order to permit the photographic images of the light produced by lamp 1 to stand out clearly.

The frame has a plurality of slots 27 cut in its upper surface and extending from the front edge of said surface to a point near the rear edge thereof. Into any adjacent pair of these slots may be slid the assembly comprised of an electromagnet core 10 and a support 26 for holding core 10 rigidly in place. The two elements may be removably held together by means of a set screw 26a and the positioning of core 10 may be further defined by an integrally attached abutting flange 10' arranged to abut against the lower surface of the top of frame 7 so as to prevent core 10 from being displaced upwardly.

Returning now to the object whose motion is to be studied, the metallic member 9 is made of a ferromagnetic material which can be held against the lower end of core 10 when the energizing winding 11 of the latter is excited. The upper surface 24 of member 9 is formed to match a mating surface 25 on the lower end of core 10 in order to assure that the lamp 1 will be properly oriented with respect to a vertical axis at the start of its fall. To this end, surfaces 24 and 25 may, for example, take the form of a portion of the lateral wall of a cylinder having a horizontal longitudinal axis. Member 9 is positioned below the upper edge of the casing 2 so that this edge may fit around the lower end of core 10 in order to further assure the accurate positioning of the object at the start of its fall. For this purpose, the lower end of core 10 is dimensioned to fit into the upper end of casing 2.

The bottom of frame 7 is furnished with a soft shock absorbing pad 14 for cushioning the fall of the object and the lower member 8 is made of a shock-absorbing material for the same purpose.

Frame 7 is preferably made of an electrically insulating material, but may also be made to be insulating only in the regions through which the various leads pass and where it is in contact with core 10 and support 26.

An alternating current for periodically exciting lamp 1 and for energizing coil 11 is connected to input terminals 15 and 16. Terminal 15 is permanently connected directly to lamp electrode 3, while terminal 16 is connected to electrode 4 through a series circuit comprising a normally open switch 17 and a suitable resistor 23, whose function will be described in detail below. In addition, when it is desired to cause only one of the electrodes of lamp 1 to become illuminated, a rectifying diode 18 is placed in series between switch 17 and electrode 4. When it is desired to cause both lamp electrodes to be rendered alternately luminous, the rectifier 18 is inserted in series between switch 17 and the plate of a thyratron triode 19 which controls the excitation of winding 11. The cathode of thyratron 19 is connected to one end of winding 11 while the other end of the winding is connected through a suitable current-limiting resistor to input terminal 16. Winding 11 is also connected in parallel with a storage capacitor C. The thyratron grid is connected to the cathode through a grid resistor 29. Across resistor 29 there is connected a series circuit comprising a normally open switch 21 and a basic source 22 whose polarity is such that when switch 21 is closed the thyratron grid is biased into its cut-off state.

Switches 17 and 22 may be of the pushbutton type, or of any other known type.

The arrangement thus far described is placed in operation by depressing, and maintaining closed, the switch 17 so as to supply alternating current to lamp 1 and to the circuit of winding 11. The current supply should be stabilized to ensure that each lamp illumination period will have a constant predetermined duration. One or both lamp electrodes will thus be intermittently rendered luminous and, since the potential of the thyratron grid is substantially equal to that of its associated cathode, tube 19 conducts each half-cycle of alternating current passed by diode 18, thus permitting winding 11 to be excited.

The object whose motion is to be studied may now be placed against the lower end of core 10, with surface 24 mating with surface 25, and will be held there by the magnetic field induced in the core.

The camera shutter may then be opened and switch 21 closed, thereby biasing tube 19 to nonconduction.

However, the nature of the thyratron, because it is a gas-discharge tube, is such that it will not cease conduction until its plate-cathode voltage drops to a predetermined value, i.e., until it reaches the end of the conduction period through which it may be passing when switch 21 is closed.

The winding 11 receives periodic current pulses from thyratron 19, which pulses also serve to charge capacitor C. After each conduction period of the thyratron, the charge on capacitor C leaks through winding 11, thereby continuing to induce a current through this winding. The time constant of the circuit constituted by winding 11 and capacitor C is given such a value that the maximum charge induced in the capacitor by each thyratron current pulse is sufficient to sustain an electromagnetic field in core 10 of sufficient value to hold the object for an accurately determined time period, which is longer than the period of the alternating supply current. This means that the object will continue to be held for a predetermined period after the commencement of the last current pulse passed by thyratron 19. Thus, since the thyratron pulses are synchronized with the alternating current supply, the release of the object will occur at an accurately predetermined phase angle of said supply current and the first lamp illumination will occur at a predetermined instant after the release of the object. This instant can be readily varied by a simple adjustment, for example, of the value of capacitor C or of the self-inductance of winding 11.

It should be obvious that, with the structure and mode of operation thus far described, the lamp will go through several cycles of illumination prior to being released. As a result, the camera film will tend to be overexposed at at point corresponding to the starting point of the object travel path and hence this point will not be accurately defined.

In order to eliminate this drawback, the structure of FIG. 1 is additionally provided with an arrangement for short-circuiting the lamp electrodes until the actual release of the object. This arrangement comprises a first conductor connected between resistor 23 and the upper end of core 10 (which, along with element 9, is a good conductor) and a second conductor connected between element 9 and lamp electrode 3. When the object is held against core 10, the low resistance path between resistor 23 and electrode 3 decreases the voltage between electrodes 3 and 4 substantially to a zero value and thus prevents them from becoming lit. The value of resistance 23 is chosen to limit the current flowing under these conditions to a safe value. With this arrangement, lamp 1 will only begin emitting light pulses when surfaces 24 and 25 separate and, as has been noted above, the first pulse can be made to occur at an accurately predetermined instant after said separation. Thus lamp 1 emits light pulses only after starting its fall, the length and position of the photographic trace of each pulse showing, respectively, the instantaneous velocity of, and distance traveled by, lamp 1.

The structure of FIG. 1 is also provided with a pair of reference light sources 12 and 13 which are mounted on one side wall of frame 7 and connected across current input terminals 15 and 16. Lamp 12 is preferably placed so that its electrodes are at the height of electrodes 3 and 4 when member 9 is in contact with core 10, while lamp 13 has its electrodes placed a predetermined distance from electrodes 3 so that the distance separating their images on the photograph will serve as a reference indicating the scale of the photograph. Thus the photographic images of the light from lamps 12 and 13 serve to indicate the height of lamp 1 at the beginning and end, respectively, of its fall.

It might be desirable to record several falls on a single film frame. This could be accomplished by displacing the camera parallel to the plane of the figure after each drop, or by maintaining the camera stationary and by displacing the support 26 and the core 10 into a new pair of slots 27 after each drop.

It might also be desirable to give the object an initial velocity rather than merely permitting it to drop of its own weight. This could be easily accomplished by placing a helical spring around the lower portion of core 10 so that it will be compressed between the lower surface of flange 10′ and the upper rim of casing 2. When the object is released from core 10, the energy stored in the compressed spring will be transmitted to the object, thereby giving the latter an initial acceleration. If desired, the spring may be permanently attached to casing 2 or flange 10′.

The assembly shown in FIG. 1 may also be used in connection with such a spring to cause the object to describe a parabolic path. For this purpose, the core 10 may be slid into a slot 27a formed in a side wall of frame 7, with the projection of support 26 resting on the upper surface of the frame. When released in this position, the object would be given an initial horizontal velocity by the expansion of the compressed spring. The height of slot 27a is chosen so that, when core 10 is placed therein, lamp 1 is at the same level as lamp 12. Alternatively, the core 10 and support 26 may be placed in adjacent slots 27 and the whole frame may be laid on its side, the pad 14 then being placed on the new lower frame surface. Again, the spring will give the object an initial horizontal velocity. In this case, lamp 12 will serve as a reference for the initial horizontal location of lamp 12.

This latter arrangement could also be modified to give the object an initial upward velocity component by providing suitable holding means near the bottom of support 1 to permit core 10 to be positioned with its end 25 higher than its other end.

FIG. 2 is a detail view, to an enlarged scale, of the object to be dropped and of the lower portion of core 10.

There is also shown a compressed spring 10a disposed around core 10 and compressed between the lower surface of flange 10' and the upper rim of casing 2. FIG. 2 also shows how the object is accurately positioned, prior to being dropped, by the mating of the lower surface of core 10 with the upper surface of member 9 and by the fitting of the upper portion of casing 2 around the lower portion of core 10.

Turning now to FIG. 3 there is shown a second embodiment of the object to be dropped, constituted essentially by: a ring 2' having a horizontal axis; an elastic shock absorbing member 8'; a shank 30 having a threaded upper end and a threaded lower end passing through an opening in the bottom of ring 2' and screwed into a suitably threaded hole in member 8'; a lamp holder comprising a base 31 supported on the upper end of shank 30 by a pair of locking nuts, and a pair of spring clips 31a supported on base 31; a lamp 1' held in clips 31a and having a pair of electrodes 3' and 4' connected, respectively, to conductors 5 and 6; and a conductive, ferromagnetic member 9' bolted to the top of ring 2' and conductively connected to electrode 3'. This object is used in the same way as the object of FIGS. 1 and 2. If it is desired to study the motion of a spherical body, a transparent hemisphere could be attached to each circular edge of ring 2'. This device may also be used with a compressed spring, one end of which would bear against ring 2'.

The principles of the present invention may easily be applied to the study of the motion of an object moving along an inclined plane. One arrangement for carrying out such a study is shown in FIG. 4 to comprise a frame member 39 supporting a shock absorbing cushion 44, a ramp 43 having its lower end placed next to the cushion, and a stand 45.

The upper end of ramp 43 is supported by a post 45' slidably mounted in a passage in stand 45 and locked in position by a set screw 45a held in stand 45. The height of post 45' may be varied in accordance with the ramp inclination desired and the position of support 45 may be varied in accordance with the length desired for the path of travel of the object whose motion is to be recorded.

Upon ramp 43 is mounted a pair of tracks 42 through the intermediary of a plurality of ties 42', if needed. It would also be possible to eliminate the ties and to fasten the tracks directly to the ramp. The wheels of a carrier vehicle 40 are placed on the tracks so that said vehicle can roll therealong. The tracks 42 can be simple model railroad tracks and the vehicle 40 can be a model railroad car of the flatcar type, for example, it having been found that such an arrangement exhibits a relatively low coefficient of rolling friction.

Vehicle 40 has a shock absorbing front bumper 41 and carries an object constituted, for example, by the ring 2' housing a neon lamp 1'. Although it is not shown in detail in FIG. 4, lamp 1' may be mounted in ring 2' in the manner shown in FIG. 3. However, because of the presence of bumper 41, ring 2' need not carry a shock absorbing member 8'. A ferromagnetic conducting member 9' is provided on ring 2' to permit the car 40 and ring 2', which is rigidly connected to car 40, to be held by core 49 when winding 11 is energized. Winding 11 and lamp 1' are connected to an electric circuit identical with that shown in FIG. 1.

Core 49 is held in place by a C-shaped member 46 which is rigidly connected to post 45' and which curves around behind ramp 43. The upper end of member 46 carries a bolt 48 passing through a longitudinal groove in metal clamp 47. Bolt 48 is arranged to cooperate with a suitable locking nut to hold the clamp tightly when the nut is tightened and upon loosening of the nut, to permit the clamp to slide longitudinally and pivot freely with respect to the bolt. Clamp 47 terminates in a collar which tightly grips core 49. Clamp 47 may be made of any hard, resilient material such as spring steel.

The inclination of ramp 43 may be readily adjusted by loosening set screw 45a, sliding post 45' into the desired vertical position, and tightening set screw 45a. The ramp portion over which car 40 travels may also be varied by shifting support 45 horizontally. If desired, the support 45 could be mounted in a groove in frame 39. The nut on bolt 48 should then be loosened and the assembly of clamp 47 and core 49 may be adjusted until core 49 is aligned with member 9'.

The device may then be put into operation in precisely the manner described in connection with the device of FIG. 1. One particularly interesting study may be carried out by maintaining support 45 in a given horizontal position and by releasing the car several times, each time with post 45' at a different height, while recording, on a single film frame, the illuminations produced by lamp 1' during each fall.

FIG. 5 shows the application of the present invention to an arrangement for studying oscillatory motions and various types of collisions. Firstly, for studying large amplitude oscillations, a single object (whose structure will be described below in connection with FIG. 5a) is used and is suspended from a suitable support 54 by means of a sturdy lead $5_1'$ connecting one lamp electrode to the electric supply circuit. The other electrode of the lamp is connected to a lead $6_1$ which may be identical with the lead 6 of FIG. 1. The two lamp leads may be connected to a source of periodic current pulses identical with the supply circuit of FIG. 1.

The object whose motion is to be recorded is shown in FIG. 5a to be roughly similar in structure to the object of FIG. 3. The FIG. 5a structure consists of a ring 62, which may be made of a transparent plastic, and a lamp 1' identical with that shown in FIG. 3. The lamp may be held in position by the arrangement of FIG. 3 or, in order to permit its illuminations to be detected from any angle, by a pair of fine wires 63 held, as shown in FIG. 5a, between opposite points on the interior surface of ring 62 and each wound tightly around a respective end of lamp 1'. Wires 63 may be attached to ring 62 by any known means such as welding, cementing, bolting, etc. The inner surface of ring 62 is also provided with two terminals for leads 5' and 6, to each of which terminals is connected a respective one of the lamp electrode leads. As has been noted above, lead 5' is selected to be strong enough to support the entire assembly. Lead 5' is also made as supple as possible.

Finally, ring 62 is provided with a pair of threaded passages 62a and 62b for the removable attachment of a suitable shock-absorbing member 8' and a suitable ferromagnetic armature member 9', respectively.

Returning now to FIG. 5, when a single object is used for the study of oscillations, the members 8' and 9' may be removed and a photographic apparatus 53 is placed on the surface of a suitable support 54 with its optical axis 52 passing slightly above the lowest point in the path of travel of ring $62_1$. The electric circuit to the lamp is then closed and the ring is placed in pendulous oscillation in a plane perpendicular to that of the figure, the shutter of camera 53 being maintained open for as long as it is desired to record the motion of the object.

If it were desired to separate the photographic traces of each oscillation of the object, camera 53 could be provided with an arrangement for continuously displacing its optical axis in a vertical direction perpendicular to the plane of oscillation of the object. To this end, the camera is shown in FIG. 5 to be partially supported by a flexible, gas-filled bladder 55 having a calibrated outlet valve 56. The valve could be opened simultaneously with the initiation of movement of the object so that axis 52 will be caused to gradually pivot in a counterclockwise direction during the period when the film is exposed. A mechanical system, although more complicated and expensive, could also be used to produce such a movement.

Whenever it is desired to cause the camera to pivot during the recording interval, it is preferred that the camera be positioned so that the center of its optical system remain stationary. This arrangement is desirable because for small angles, it causes the distance between the point on the film plate at which a light flash is recorded and the point where the flash would have been recorded had there been no rotation to be a linear function of the angle through which axis 52 has rotated when said flash occurs. The same result can be attained by maintaining the orientation of axis 52 constant and by moving camera 53 in a vertical direction at a constant speed.

The apparatus of FIG. 5 also lends itself readily to the study of the effects of impacts or shocks when provided with two pendulously supported objects, each identical in structure and method of suspension, with the object shown and described in connection with FIG. 5a, and with a camera 58 placed on support 54 below the objects and having a vertically oriented optical axis 59 substantially in line with the point of impact of the two objects.

These objects are designated in FIG. 5 by rings $62_1$ and $62_2$, each suspended by a lead $5_1'$ and $5_2'$, respectively, and each connected to a second lamp electrode lead $6_1$ and $6_2$, respectively. For studying various types of impacts, each ring carries, by means of one of its threaded passages, a suitable shock-absorbing member, or bumper, $8_1'$ and $8_2'$, respectively, positioned to serve as the point of contact between the objects. These bumpers may be identical in shape with member 8' of FIG. 3 and carry suitable bolts, integrally associated therewith and projecting from the surface which will bear against ring 62, adapted to engage in the appropriate ring passage. Different bumpers having varying resiliency characteristics may be interchangeably mounted on rings 62 so as to vary the reaction resulting from each impact.

According to a first mode of operation, ring $62_1$ is initially placed in a stationary position, with lead $5_1'$ vertical, while ring $62_2$ is displaced to the left, as shown in FIG. 5. The available passage in ring $62_1$ may receive a suitable balancing member identical in structure to member $8_1'$, while the available passage of ring $62_2$ may also receive such a balancing member or, preferably, a ferromagnetic member $9_2'$ having substantially the same weight as member $8_2'$ and associated with a suitably positioned core and winding identical in structure with that shown in FIG. 1. This winding may be connected, in a manner identical with that of winding 11 of FIG. 1, to a control circuit identical with that of FIG. 1, while leads 5' may be connected together and leads 6 connected together, the two pairs of leads then being connected to the electric supply circuit in a manner identical with that shown for leads 5 and 6 of FIG. 1. This arrangement permits the position of the release of ring $62_2$ to be acurately controlled and, if one lead of the lamp of ring $62_2$ is connected to member $9_2'$, assures that the lamps will not begin to emit light pulses until after the release of ring $62_2$. The latter result occurs because, with the lamps connected in parallel, and with the lamp of ring $62_2$ associated with a short-circuiting path similar to that of FIG. 1, the short-circuiting of one lamp effectively short-circuits both lamps.

According to a second mode of operation, both rings are displaced from their stable equilibrium positions and are released simultaneously to permit the study of impacts between moving objects. To this end, it is very advantageous to also equip ring $62_1$ with a ferromagnetic member $9_1'$ and to provide a second core and winding identical with the core 10 and winding 11 of FIG. 1, with the core being suitably positioned and the winding being connected in parallel with the winding associated with ring $62_2$. This arrangement presents the advantages of permitting the initial heights of both objects to be accurately adjusted and of permitting both objects to be simultaneously released, if desired. In addition, it would be a simple matter to vary the time delay of the de-energization of one winding if it is desired to release one object at a predetermined moment after the release of the other object.

In either of the above cases, the camera shutter is opened simultaneously with, or shortly prior to, the release of one or both objects.

Camera 58 could also be used, in connection with a single ring $62_1$, to study elliptical paths created by giving the object an initial impulsion in a direction not intersecting the vertical line passing through the point of attachment of lead $5_1'$ to support 54.

The apparatus of FIG. 5 could also be used to verify the behavior of the Huyghens pendulum by using a single ring $62_1$ and by forming support 54 to have two downwardly-directed cycloidal surfaces each disposed to a respective side of the point of attachment of lead $5_1'$ to support 54 and each tangent to said point of attachment. With such an arrangement, lead $5_1'$ will always contact one of said surfaces so that as the object oscillates the effective length of lead $5_1'$ varies periodically.

FIG. 6 shows a further embodiment of the present invention for the study of the motion of a "double pendulum." This arrangement comprises a camera 58, positioned in the same manner as the similarly-numbered camera of FIG. 5, and a double pendulum comprising a ring 62 suspended by lead 5' from an auxiliary support 66, which is in turn supported by a pair of conductors 64 and 65 connected to stationary support 54. The mode of suspension of support 66 permits it to oscillate only in a vertical plane perpendicular to the plane of the drawing, while the single-wire suspension of ring 62 permits it to oscillate in any plane. The lamp of ring 62 is supplied with current pulses by way of leads 5' and 6, each of which is connected to respective one of conductors 64 and 65, the latter being in turn connected to a supply circuit similar to that of FIG. 1. The period of oscillation of ring 62 in a plane perpendicular to that of the figure will be a function of the distance L separating it from support 54, while its oscillation period in a plane parallel to that of the figure will be a function of the distance $l$ separating it from support 66.

In operation, support 66 is caused to oscillate in said plane perpendicular to the figure while ring 62 is caused to oscillate in a plane perpendicular thereto. The composite motion of ring 62 is recorded by camera 58 and gives rise to a trace corresponding to the well-known Lissajous patterns. The trace corresponding to each period of oscillation may be separated from the others simply by counting the number of points making up each component of the compound oscillation.

FIG. 7 shows an arrangement for producing and recording linear harmonic oscillations with the aid of a relatively weak spring 74 supporting ring 62 and serving as one of the conducting leads for the lamp. This spring may be mounted on ring 62 by means of a bolt or clip held in opening 62a (FIG. 5a) and, if desired, a ferromagnetic member 9' may be screwed into passage 62b. This ferromagnetic member, in addition to permitting a variation of the weight of the oscillating mass, may be used in conjunction with a core and winding arrangement (not shown) similar to that of FIG. 1 and placed below the object to permit the spring to be tensioned by an accurately determined amount and to ensure that the oscillating system be subjected only to vertical forces at the start of oscillation.

The system may be caused to oscillate in air, or it may be surrounded by a container 71 filled with liquid. Thus, oscillations in media of different viscosities may be studied. The container 71 and a base 76 for camera 78 are placed on a support 54.

If desired, the base 76 may contain a motor and speed reducer having a vertical output shaft carrying a turntable 79 upon which camera 78 is placed. By rotating turntable 79 at a low, constant velocity during the oscillation photographing period a uniform displacement of the image of each cycle of oscillation is obtained with respect to those of the other cycles, in such a way as to produce a record of the oscillations in the form of a damped sinusoidal curve.

In FIG. 8 there is shown an apparatus for the study of various types of cycloidal movements and of the effect of centrifugal force on a rotating object.

The apparatus comprises a stand 89 placed on support 54 and carrying a variable speed motor 82 whose shaft rotates a plate 83. To plate 83, which may be made of an electrically conducting material, are connected an arm 86, for supporting a plurality of lamps 1, and a ring 85 of insulating material. A ring 84 of conducting material is in turn mounted on ring 85 and is in constant contact with a conducting brush assembly 90.

Plate 83 also carries, on its rim, a flexible, yet relatively stiff, spring blade 81 upon the free end of which is mounted a lamp $1_5$. Arm 86 carries a regularly spaced series of lamps $1_1$, $1_2$, $1_3$ and $1_4$. Each of the above lamps may be identical in structure with the lamp 1 of FIG. 1 and may be attached to its support member by cementing, clamping, or any other suitable means.

One electrode of each of the lamps $1_1$ to $1_4$ is connected by means of a lead 87 to ring 84, while one electrode of lamp $1_5$ is connected to ring 84 by means of a lead 88. The other electrode of each lamp is connected to plate 83, either directly through arm 86 or directly through blade 81, both of which are made of conducting material. The lamps are supplied with current pulses from a circuit connected between unit 90 and plate 83 (connections not shown).

Support 54 also caries a stand 76 containing a speed reduction motor whose vertical shaft supports and drives a turntable 79 upon which is placed a camera 78. The optical axis of camera 78 preferably lies in the horizontal plane containing the axis of rotation of the shaft of motor 82.

Lamp $1_4$ is aligned with the last-named axis, while lamp $1_3$ is placed midway between the center of rotation and the circumference of plate 83, lamp $1_2$ is placed at said circumference, and lamp $1_1$ is placed beyond the circumference.

When plate 83 is rotated, lamp $1_5$ will be deflected radially outward by an amount proportional to its own weight and to the speed of plate rotation.

The production of various types of curves of cycloidal form on the film plate is produced by rotating plate 85, periodically illuminating lamps $1_1$ to $1_4$, and rotating turntable 79 at a speed which causes the tangential velocity of the point on the camera optical axis which intersects a vertical plane passing through the electrodes of lamps $1_1$ to $1_4$ to equal the tangential velocity of lamp $1_3$.

When this condition is met, the points representing the trace of lamp $1_4$ on the film plate will lie in a straight line and will serve as a reference indicating the speed advance of the camera axis. The film trace of lamp $1_2$ will represent a cycloid having a vertical amplitude proportional to the diameter of plate 83. Similarly, the film trace of lamp $1_1$ will present the form of an elongated cycloid while that of lamp $1_3$ will describe a shortened cycloid.

By maintaining camera 78 stationary while rotating plate 83 at varying speeds, a roughly circular trace of the path of lamp $1_5$ can be obtained, each point of said trace having a radial position indicating the instantaneous value of the centrifugal force on lamp $1_5$ and a length proportional to the corresponding tangential velocity thereof.

While several preferred embodiments of the present invention have been herein shown and described, it should be appreciated that the principles upon which they are based are broad enough to include many variations and modifications and that the scope of this invention should therefore be limited only by the breadth of the appended claims. For example, the values of the various electrical circuit elements can easily be chosen to permit the systems to be supplied with current directly from the building's electrical power system. In addition each of the embodiments may be used in conjunction with scale reference lamps such as those shown in FIG. 1. Furthermore, it would be advantageous to use cameras of the self-developing type, such as the Polaroid cameras, because such devices rapidly yield a usable record and because they employ extremely fast films.

What I claim is:

1. In an apparatus for the study of the basic laws of motion, said apparatus comprising a support frame and an optical recording device, the improvement comprising:
   (a) an object whose motion is to be studied, which object carries a ferromagnetic armature;
   (b) a lamp contained in said object;
   (c) a source of current for periodically energizing said lamp;
   (d) a pair of flexible conductors connecting said source to said lamp;
   (e) a releasable holding means including an electromagnet whose core is shaped to engage said armature for holding said object at the highest point of its projected travel path;
   (f) means connected to said holding means and including an electric control circuit connected between said source of current and the control winding of said electromagnet for controlling the release of said object; and
   (g) short-circuiting means connected between said lamp and said current source for short-circuiting said lamp as long as said object is held by said holding means.

2. Apparatus as recited in claim 1, wherein said short-circuiting means is constituted by a low resistance path through said electromagnet core and said armature.

3. In an apparatus for the study of the basic laws of motion, said apparatus comprising a support frame and an optical recording device, the improvement comprising:
   (a) an object whose motion is to be studied, which object carries a ferromagnetic armature;
   (b) a lamp contained in said object;
   (c) a source of current for periodically energizing said lamp;
   (d) a pair of flexible conductors connecting said source to said lamp;
   (e) releasable holding means including an electromagnet whose core is shaped to engage said armature for holding said object at the highest point of its projected travel path; and (f) means connected to said holding means and including an electric control circuit connected between said source of current pulses and the control winding of said electromagnet for controlling the release of said object, said electric control circuit including manual switch means and control means for interrupting the supply of current to said eectromagnet winding at a predetermined instant after the start of the current pulse following the actuation of said manual switch.

4. In an apparatus for the study of the basic laws of motion, including the study of the effects of impacts or shocks upon pendulously supported objects, said apparatus comprising a support frame and an optical recording device, the improvement comprising:
   (a) an object whose motion is to be studied;
   (b) a lamp contained in said object;
   (c) a source of current for periodically energizing said lamp; and
   (d) a pair of flexible conductors connecting said source to said lamp, one of said pair of conductors being made sufficiently strong to support said object and said object being suspended from said frame by means of said one of said pair of conductors for pendulous oscillatory motion.

5. Apparatus as recited in claim 4, wherein said recording device is mounted to have its optical axis move at a constant velocity in a vertical plane perpendicular to the plane of oscillation of said object.

6. Apparatus as recited in claim 5, wherein said movement of said axis is a pivotal movement about the center of the optical system of said recording device.

7. Apparatus as recited in claim 5, wherein said movement is a linear movement in a direction perpendicular to said optical axis.

8. In an apparatus for the study of the basic laws of motion, said apparatus comprising a support frame and an optical recording device, the improvement comprising:
   (a) an object whose motion is to be studied;
   (b) a lamp contained in said object;
   (c) a source of current for periodically energizing said lamp;
   (d) a pair of conductors connecting said source to said lamp;
   (e) a plate;
   (f) means for rotating said plate about an axis parallel to the optical axis of said recording device; and
   (g) connecting means mounted on said plate and carrying said object, said connecting means including a resilient strip having its longitudinal dimension parallel to the axis of rotation of said plate, one end of said strip being connected to said plate and the other end thereof carrying said object.

9. In an apparatus for the study of the basic laws of motion, said apparatus comprising a support frame and an optical recording device, the improvement comprising:
   (a) an object whose motion is to be studied;
   (b) a lamp continued in said object;
   (c) a source of current for periodically energizing said lamp;
   (d) a pair of conductors connecting said source to said lamp;
   (e) a plate;
   (f) means for rotating said plate about an axis parallel to the optical axis of said recording device;
   (g) connecting means mounted on said plate and carrying said object; and
   (h) means for moving said optical recording device at a constant speed so that its optical axis moves in a plane perpendicular to the plane of rotation of said plate.

References Cited

UNITED STATES PATENTS

| | | | |
|---|---|---|---|
| 1,199,980 | 10/1916 | Gilbreth | 346—107 X |
| 2,420,339 | 5/1947 | Rabinow | 95—36 |

JOHN M. HORAN, *Primary Examiner.*